US008146751B2

(12) United States Patent
Hawkins et al.

(10) Patent No.: US 8,146,751 B2
(45) Date of Patent: Apr. 3, 2012

(54) FILTER ELEMENT WITH THREADED TOP ENDPLATE

(75) Inventors: Charles W. Hawkins, Sparta, TN (US); Ismail C. Bagci, Cookeville, TN (US); William R. Knox, Cookeville, TN (US); Jeffrey A. Husband, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 593 days.

(21) Appl. No.: 12/277,724

(22) Filed: Nov. 25, 2008

(65) Prior Publication Data

US 2010/0126919 A1    May 27, 2010

(51) Int. Cl.
*B01D 27/00* (2006.01)
(52) U.S. Cl. ............... 210/450; 210/232; 210/416.5; 210/437; 210/443; 210/497.01
(58) Field of Classification Search .................. 210/435, 210/437–439, 441, 446, 450, 459–463, 167.08, 210/497.01–497.3; 55/361–382, 490–519
See application file for complete search history.

(56) References Cited

U.S. PATENT DOCUMENTS

| | | | | |
|---|---|---|---|---|
| 5,458,767 A | * | 10/1995 | Stone | 210/90 |
| 5,484,527 A | * | 1/1996 | Janik et al. | 210/232 |
| 5,609,760 A | * | 3/1997 | Leach | 210/416.1 |
| 5,681,461 A | * | 10/1997 | Gullett et al. | 210/232 |
| 5,698,097 A | * | 12/1997 | Gebert et al. | 210/248 |
| 6,113,781 A | * | 9/2000 | Popoff et al. | 210/234 |
| 6,146,527 A | | 11/2000 | Oelschlaegel | |
| 6,251,273 B1 | * | 6/2001 | Jawurek et al. | 210/232 |
| 6,554,139 B1 | * | 4/2003 | Maxwell et al. | 210/435 |
| 7,141,163 B2 | | 11/2006 | Girondi | |
| 7,326,342 B2 | * | 2/2008 | Richmond et al. | 210/234 |
| 2003/0201221 A1 | * | 10/2003 | Durre | 210/444 |
| 2003/0222010 A1 | * | 12/2003 | Bassett et al. | 210/312 |
| 2005/0211623 A1 | * | 9/2005 | Moscaritolo et al. | 210/440 |
| 2006/0231479 A1 | * | 10/2006 | Clausen et al. | 210/435 |
| 2007/0056897 A1 | * | 3/2007 | Bhardwaj et al. | 210/437 |
| 2007/0163947 A1 | * | 7/2007 | Clausen et al. | 210/450 |
| 2007/0205157 A1 | * | 9/2007 | Jones et al. | 210/688 |

(Continued)

FOREIGN PATENT DOCUMENTS

WO    2005/005014    1/2005

OTHER PUBLICATIONS

U.S. Appl. No. 12/277,756, filed Nov. 25, 2008.

(Continued)

*Primary Examiner* — Duane Smith
*Assistant Examiner* — Thomas McKenzie
(74) *Attorney, Agent, or Firm* — Hamre, Schumann, Mueller & Larson, P.C.

(57) ABSTRACT

A filter assembly where the filter element is designed to connect directly to the spud of a vehicle fluid system, for example an engine lubrication system, a fuel system, or a hydraulic system. This provides a direct connection between the filtered fluid and the fluid system. The need for a seal between the top endplate and the nutplate, as well as the coil spring within the shell, which are found in conventional spin-on filter assemblies can be eliminated, which reduces inventory and the number of parts forming the filter assembly, and facilitates manufacturing of the filter assembly.

22 Claims, 5 Drawing Sheets

U.S. PATENT DOCUMENTS

| | | | |
|---|---|---|---|
| 2007/0241047 A1 | 10/2007 | Roll et al. | |
| 2007/0267338 A1* | 11/2007 | Menez et al. | 210/435 |
| 2007/0289915 A1* | 12/2007 | Jiang et al. | 210/338 |
| 2008/0223774 A1* | 9/2008 | Chen et al. | 210/232 |
| 2008/0308481 A1 | 12/2008 | Wieczorek et al. | |

OTHER PUBLICATIONS

U.S. Appl. No. 12/265,370, filed Nov. 5, 2008.

U.S. Appl. No. 12/277,643, filed Nov. 25, 2008.

International Search Report for corresponding international application No. PCT/US2009/058198, dated May 3, 2010 (4 pages).

Written Opinion of the International Searching Authority for corresponding international application No. PCT/US2009/058198, dated May 3, 2010 (4 pages).

* cited by examiner

FILTER ELEMENT WITH THREADED TOP ENDPLATE

FIELD

This disclosure relates generally to fluid filtration, and particularly, but not by way of limitation, to the design of a filter assembly that includes a filter element intended to connect directly to the engine.

BACKGROUND

A known type of fuel and oil filter includes a shell, a nutplate secured to the shell, and a filter element disposed within the shell. The nutplate includes a threaded aperture through which filtered fluid exits the filter, and which engages with threads on an engine spud to secure the filter to the engine. Filtered fluid that exits the filter through the aperture flows into the engine spud and to the engine. This type of filter is sometimes referred to as a spin-on filter.

In a spin-on filter, an inner elastomeric sealing member is typically provided between the nutplate and a top endplate of the filter element to prevent bypass of fluid around the filter from the unfiltered fluid side to the filtered fluid side. A coil spring is also typically provided between the base of the shell and the bottom of the filter element to bias the filter element upwardly into engagement with the nutplate and enhance the seal between the nutplate and the filter element. However, if the inner sealing member is not installed correctly or the spring does not seat properly against the filter element, an internal bypass situation can result whereby unfiltered fluid can bypass the filter. If this occurs, unfiltered fluid can flow to the engine which can lead to increased engine wear and damage.

SUMMARY

A vehicle filter assembly is described where the filter element is designed to connect directly to the spud of a vehicle fluid system, for example an engine lubrication system, a fuel system, or a hydraulic system. This provides a direct connection between filtered fluid and the fluid system. In the case of a spin-on filter, the need for a seal between the top endplate and the nutplate, as well as the coil spring within the shell, can be eliminated which reduces inventory and the number of parts forming the filter assembly, and facilitates manufacturing of the filter assembly.

In one embodiment, a filter element includes filter media suitable for filtering a fluid, such as oil, fuel, or hydraulic fluid. The filter media has a first end and a second end, and defines an inner region that is surrounded by the filter media. A top endplate is secured to the first end of the filter media and a bottom endplate is secured to the second end. The top endplate includes an opening therein that is in fluid communication with the inner region and a sleeve extending from the opening to an open end thereof. The sleeve defines a fluid flow passageway from the opening to the open end. The sleeve includes structure suitable for securing the sleeve directly to a spud of an engine fluid system. For example, the sleeve includes an inner surface defining the fluid flow passageway, and at least a portion of the inner surface adjacent the open end of the sleeve is threaded. The threads are used to connect the filter element directly to the fluid system spud. The bottom endplate is solid without any fluid flow passageways.

The filter element forms part of a filter assembly that includes a shell having an interior space that receives the filter media of the filter assembly, and a retainer or nutplate secured to an open end of the shell. The retainer is secured to the top endplate, and the sleeve of the top endplate extends through the retainer to permit the open end to communicate with an exterior of the filter assembly.

In addition to being directly secured to the spud, the top endplate includes structure that is engaged with structure on the retainer that prevents relative rotation between the top endplate and the retainer during installation and removal of the filter assembly from the spud. In addition, a snap-lock connection between the top endplate and the retainer secures the top endplate to the retainer.

DETAILED DESCRIPTION

Figure 1:
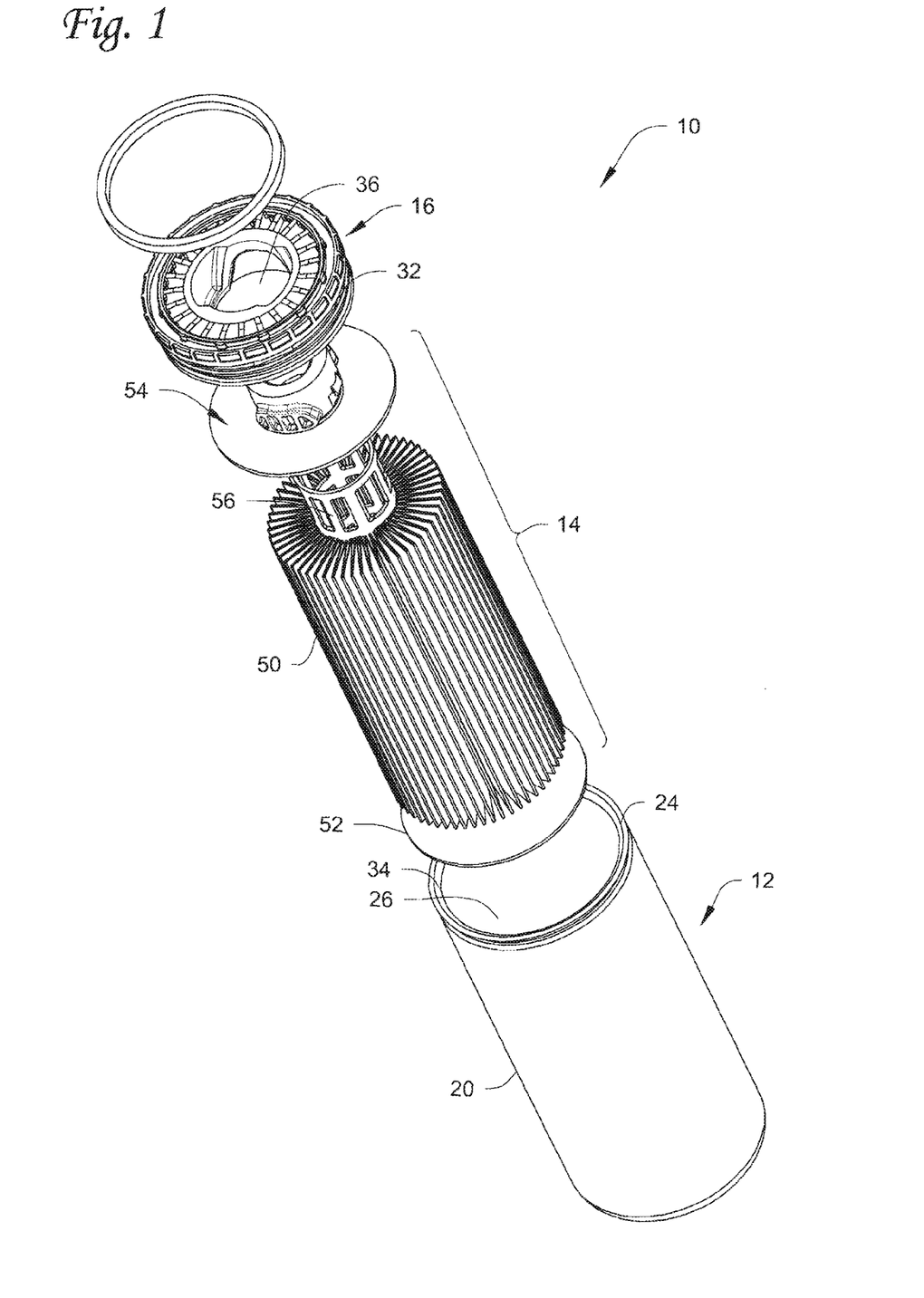
FIG. 1 is an exploded perspective view of the elements of the filter assembly described herein.

With reference to FIG. 1, a filter assembly 10 is illustrated that includes a shell 12, a 10 filter element 14, and a retainer 16. As described using an exemplary embodiment below, the filter element 14 is designed to connect directly to a conventional spud of a vehicle fluid system. The filter assembly 10 receives fluid to be filtered, filters the fluid, and directs filtered fluid back to the fluid system. The vehicle fluid system can be any fluid system on a vehicle, for example an engine lubrication system, an engine fuel system such as a diesel fuel system, or a hydraulic system. The term "fluid" as used in this disclosure and the claims is considered to encompass vehicle fluids including, but not limited to, lubrication oil, fuel including diesel fuel, hydraulic fluid, etc. Thus, the filter assembly 10 can be variously called an oil filter assembly, a fuel filter assembly, a hydraulic fluid filter assembly, etc. depending upon the type of fluid to be filtered by the filter assembly. Preferably, the filter assembly 10 is used as an oil or fuel filter assembly on a diesel engine.

Figure 2:
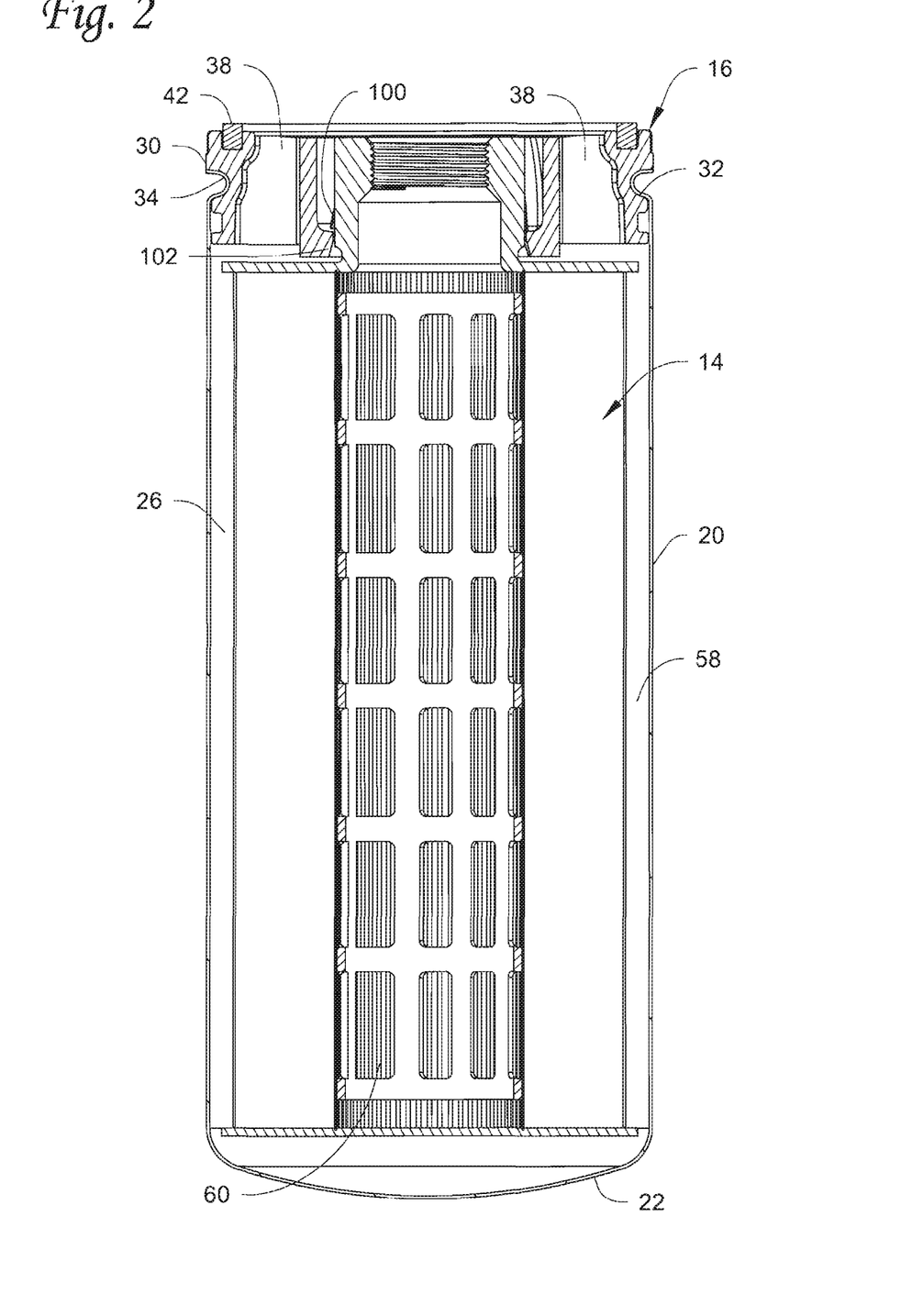
FIG. 2 is a cross-sectional side view of the assembled filter assembly.

With reference to FIGS. 1 and 2, the shell 12 has a substantially cylindrical sidewall 20, a base portion 22 integral with the sidewall that forms a closed end of the shell 12, an open end 24, and an interior space 26 defined by the sidewall 20 and the base portion 22. In the illustrated embodiment, the shell 12 is generally cylindrical in shape, although in appropriate circumstances the shell 12 could have different shapes. The shell 12 is formed of any material that is suitable for forming a shell on a filter assembly, for example steel. In appropriate circumstances the shell 12 could be formed of a non-metallic material such as a plastic or a composite.

Figure 4:
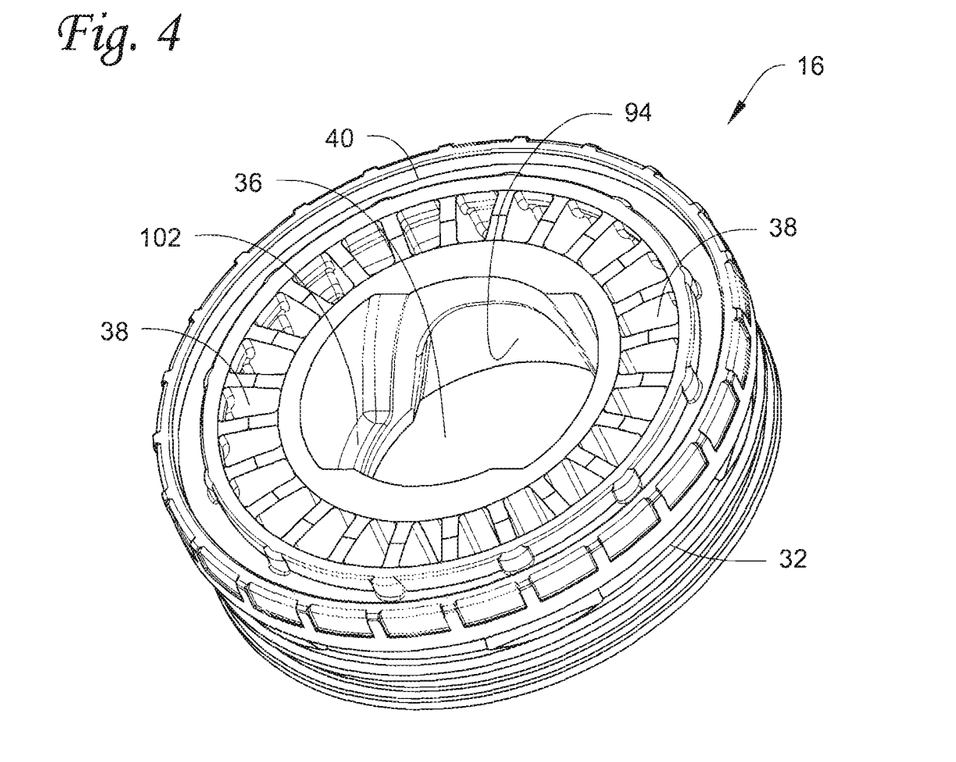
FIG. 4 is a perspective view of the retainer of the filter assembly.

The retainer 16 is fixed to the open end 24 of the shell 12 and substantially closes the open end. Referring to FIGS. 1, 2 and 4, the retainer 16, which can also be referred to as a nutplate, is a cylindrical, ring-shaped member with an outer peripheral surface 30 having a circumferential retention groove 32. The upper end of the sidewall 20 is formed with a bead 34 that fits within the groove 32. The bead 34 can then be secured to the groove 32 in known manner to prevent relative rotation between the shell 12 and the retainer 16. For example, the bead 34 can be staked to the groove 32.

The retainer 16 also includes a central opening 36 for receiving a portion of the filter element 14 as described further below. A plurality of inlet fluid flow openings 38 are formed through the retainer 16 surrounding the opening 36 through which fluid to be filtered enters the filter assembly 10. A gasket groove 40 is formed in the top surface of the retainer 16, and a rectangular elastomeric gasket 42 seats in the groove 40 for sealing with a surface surrounding the spud.

The retainer 16 is formed of any material that is suitable for forming a nutplate on a spin-on filter assembly, for example a metal such as aluminum, or a non-metallic material such as a plastic or a composite.

Returning to FIG. 1, the filter element 14 includes a ring of pleated filter media 50, a bottom end plate 52 and a top end plate 54. The filter media 50 can be any filter media that is suitable for filtering the fluid with which the filter assembly 10 is to be used. Many types of filter media exist, and a person of ordinary skill in the art would know the appropriate filter media to use.

As used herein, a ring of filter media is any endless filter media that bounds an area. As evident from FIG. 1, the filter media 50 forms a generally circular ring. The media 50 is disposed around a perforated center tube 56 which helps retain the circular shape of the media. When the filter assembly 10 is assembled, an unfiltered fluid region 58 is defined between the inner surface of the shell 12 and the outer circumference of the filter media 50, while a filtered fluid or inner region 60 is defined by the inner space within the center tube 56 and the inner perimeter of the filter media. Thus, the filter element 14 in the illustrated embodiment is designed for outside-in flow of fluid. However, in other embodiments, the filter element could be designed for inside-out fluid flow.

Figure 3:
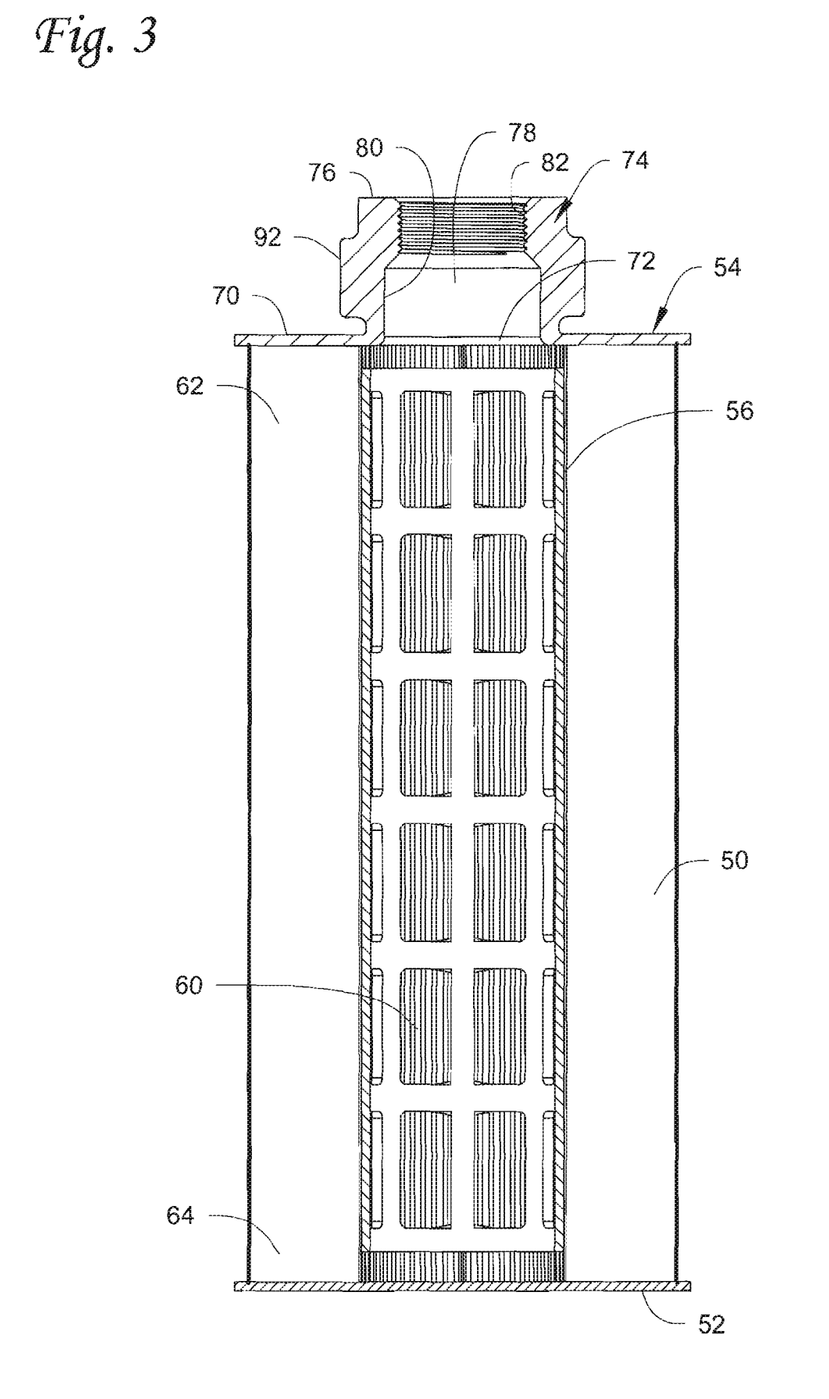
FIG. 3 is a cross-sectional side view of the filter element of the filter assembly.

As best seen in FIG. 3, the filter media 50 includes a first end 62 that is secured to the top endplate 54, and a second end 64 that is secured to the bottom endplate 52. The endplates 52, 54 are preferably formed from a non-metallic material such as plastic or composite, but could be also formed of metal. Any suitable means for securing the ends 62, 64 to the endplates 54, 52 can be used including, but not limited to, adhesive or embedding the media into the endplates.

The bottom endplate 52 is illustrated as being a solid plate without any fluid flow passageways which closes off the bottom end of the filter media 50 and prevents filtered fluid from exiting through the bottom of the filter element. However, in certain filters, such as lube filters, one or more bypass valves can be provided in the bottom endplate and/or other openings can be provided that allow fluid flow through the bottom endplate.

Figure 5:
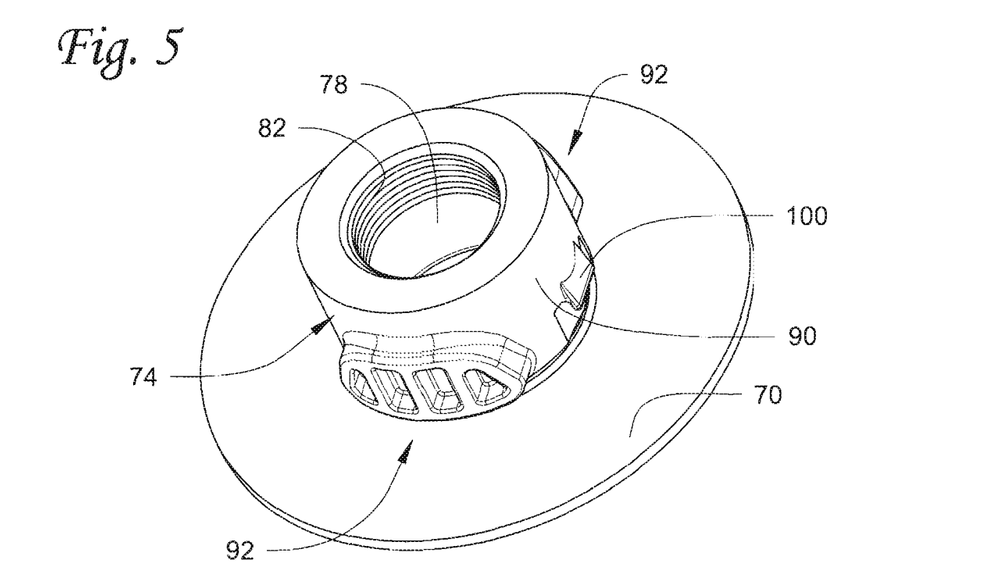
FIG. 5 is a perspective view of the top endplate of the filter element.

The top endplate 54, which is best seen in FIGS. 3 and 5, includes a ring-shaped flange 70 to which the first end 62 of the filter media 50 is secured. An opening 72 is formed in the endplate 54 surrounded by the flange 70. A cylindrical sleeve 74 extends upwardly from the opening 72 to an open end 76, and a fluid flow passageway 78, defined by an inner surface 80 of the sleeve, extends from the opening 72 to the open end 76. At least a portion of the inner surface 80 adjacent the open end 76 is threaded 82. The threads 82 are used to connect the filter assembly 10 to the spud. In the illustrated embodiment, the threads 82 extend from the open end 76 downward approximately one-third of the length of the inner surface 80. Structure other than threads 82 that one finds suitable for securing the sleeve directly to a spud of a vehicle fluid system can be used, for example a snap-fit connection structure.

There is structure engaged between the top endplate 54 and the retainer 16 that prevents relative rotation therebetween when the elements are assembled. For example, as best seen in FIG. 5, an outside surface 90 of the sleeve 74 includes a plurality of anti-rotation members 92 at spaced locations around the sleeve. In the illustrated embodiment, a pair of members 92 are provided at diametrically opposed locations on the outside surface 90, with the members 92 being identical in construction. Other numbers of members 92 can be used. The members 92 are illustrated as comprising protrusions projecting from the outside surface 90, but other forms of anti-rotation members can be used. With reference to FIG. 4, the retainer 16 includes a plurality of anti-rotation members 94 that are configured to engage with the anti-rotation members 92. The members 94 comprise diametrically opposed slots formed in the retainer that are designed with a shape generally complementary to the members 92 so as to receive the members 92 therein.

When the endplate 54 and the retainer 16 are brought into engagement as discussed further below, the members 96 will receive the members 94 therein. The shapes of the members 94, 96 will prevent relative rotation between the endplate 54 and the retainer 16.

In addition, there is structure axially securing the top endplate 54 and the retainer 16. In the illustrated embodiment, the structure comprises a snap-lock connection between the top endplate and the retainer. More particularly, with reference to FIGS. 2 and 5, a plurality of snap-lock tabs 100 are formed on the outside surface 90 of the sleeve in the gaps between the anti-rotation members 92. In addition, the retainer 16 is provided with snap-lock members 102 that are designed to engage with the snap-lock tabs 100. When the endplate 54 and the retainer are brought into engagement as discussed further below, the snap-lock members 102 will be deflected outwardly by the snap-lock tabs 100, until the members 102 clear the tabs 100 at which point the members 102 will deflect back to the position shown in FIG. 2 behind the tabs 100. The tabs 100 and the members 102 will prevent axial removal of the endplate 54 and the retainer 16 once they are engaged.

Figure 6:
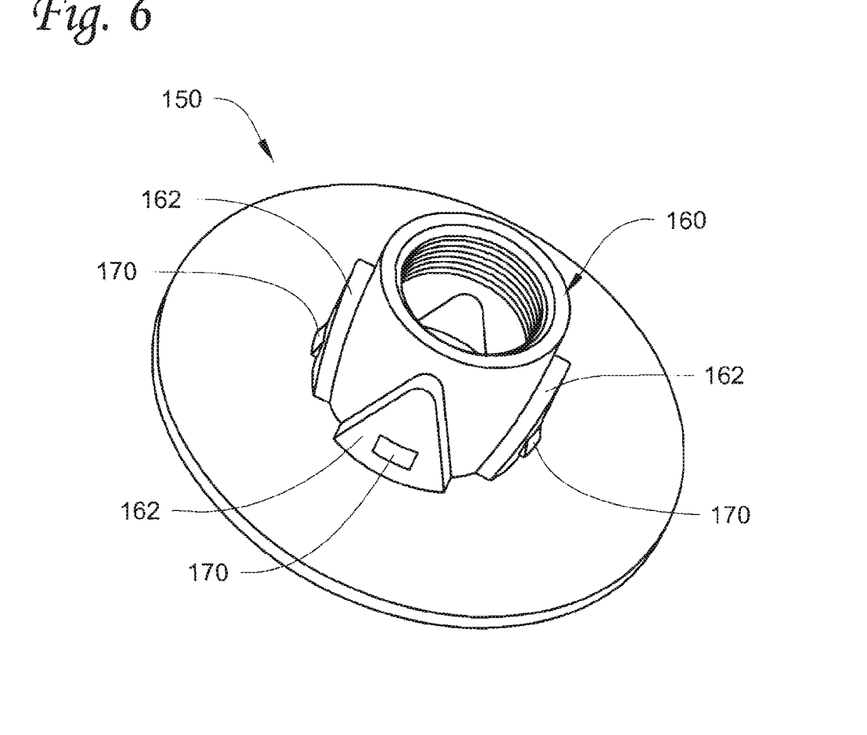
FIG. 6 is a perspective view of an alternative embodiment of a top endplate.
Figure 7:
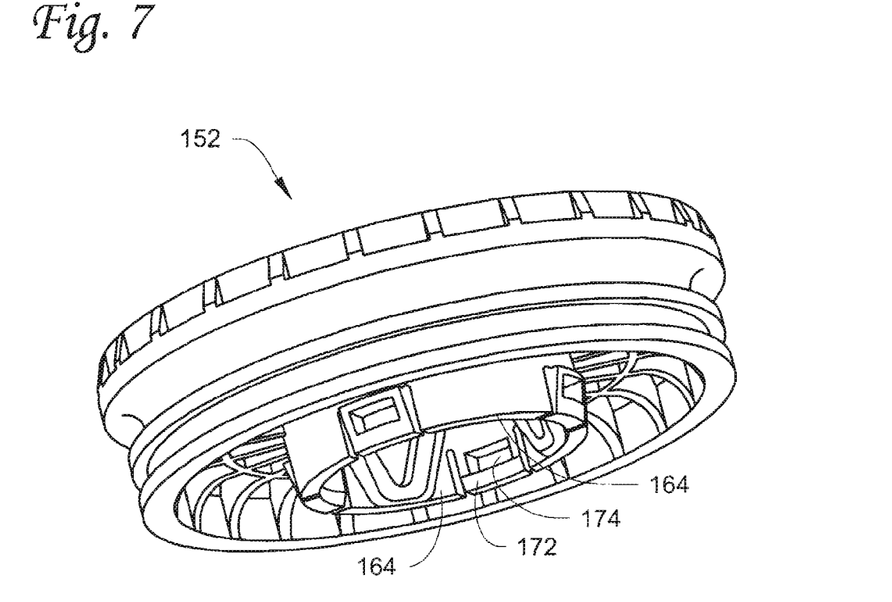
FIG. 7 is a perspective view of an alternative embodiment of a retainer used with the top endplate of FIG. 6.

FIGS. 6 and 7 illustrate an alternative embodiment of a top endplate 150 and a retainer 152 utilizing different anti-rotation structure and axial securement structure. The top endplate 150 includes a sleeve 160 with a plurality, for example four (only three being visible in FIG. 6), of triangular shaped anti-rotation members 162 in the form of protrusions. The retainer 152 includes a plurality, for example four, triangular shaped slots 164 that receive the members 162 therein when the endplate 150 and the retainer 152 are brought into engagement. Axial securement is provided by snap-lock tabs 170 formed on the anti-rotation members 162, and snap-lock members 172 associated with each slot 164. Each snap-lock member 172 includes a window 174 that is designed to receive a corresponding snap-lock tab 170 therein for axially fixing the endplate and the retainer when the endplate 150 and the retainer 152 are brought into engagement.

Although the number of snap-lock tabs is illustrated as corresponding to the number of anti-rotation members, any number of snap-lock tabs and anti-rotation features can be used as long as the functions of anti-rotation and axial securement between the top endplate and the retainer are achieved.

The construction and operation of the filter assembly 10 will now be described. The filter element 14 is first assembled, with the filter media 50 being disposed around the center tube 56 and the ends 62, 64 of the filter media being secured to the endplate 54, 52. The retainer 16 and the filter element 14 are then brought together, with the sleeve 74 of the top endplate 54 being inserted through the central opening 36 of the retainer. The sloped sides of the anti-rotation members and the anti-rotation slots will help achieve correct alignment of the top endplate and the retainer, as well as align the snap-lock axial securement features. When the retainer and the top endplate are aligned correctly, the retainer and the top endplate are snapped together.

The connected filter element and retainer are then installed into the shell 12. The bead 34 of the shell 12 is formed in the groove 32, and the shell 12 is locked to the retainer 16 by, for example, staking the bead 34 in the groove 32. The rectangular gasket 42 is then installed into the gasket groove 40.

The assembled filter assembly 10 is shown in FIG. 2. The filter assembly is installed by threading the threaded sleeve 74 of the filter element 14 onto the threaded spud of the fluid system. During installation (as well as removal of the filter assembly) onto the spud, the anti-rotation members 92, 94 prevent relative rotation between the retainer and the filter element. In addition, the securement of the shell 12 to the groove 32 prevents relative rotation between the shell and the retainer 16.

When installed, fluid to be filtered enters the filter assembly via the flow openings 38 in the retainer, flows down to above the flange 70 of the top endplate, and around the edges of the flange 70 to the unfiltered fluid region 58. The fluid then flows through the filter media 50 which filters the fluid. The filtered fluid then reaches the filtered fluid region 60, flows upwardly through the opening 72, into the fluid flow passageway 78 through the sleeve 74 and out the sleeve into the spud for return to the fluid system.

The disclosed filter assembly 10 eliminates the need for a seal between the top endplate and the retainer since the return flow path of the sleeve 74 is directly connected to the fluid system spud. In addition, since the filter element is directly connected to the spud, a coil spring as found in conventional spin-on filters that biases the filter element upwardly into engagement with the nutplate is no longer required.

The described embodiments are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A filter element comprising:
    filter media suitable for filtering a fluid, the filter media having a first end, a second end, and defining an inner region that is surrounded by the filter media; and
    a top endplate secured to the first end of the filter media, the top endplate including an opening therein that is in fluid communication with the inner region and a sleeve that is integrally formed with the top endplate so that there is no seal between the sleeve and the top endplate, the sleeve extending from the opening in a direction away from the second end to an open end thereof and defining a fluid flow passageway from the opening to the open end, the sleeve including an inner surface defining the fluid flow passageway, and at least a portion of the inner surface adjacent the open end of the sleeve is threaded;
    the top endplate includes a flange that extends radially outward from the sleeve so as to overlap the first end of the filter media, the radially extending flange is devoid of fluid flow passageways therethrough;
    the sleeve further includes an outer surface, and a plurality of anti-rotation members are disposed on the outer surface at spaced locations around the sleeve; and
    a bottom endplate secured to the second end of the filter media.

2. The filter element of claim 1, wherein the filter media is generally circular, the inner region is a filtered fluid side of the filter media, and the fluid flow passageway is a fluid flow outlet for filtered fluid.

3. The filter element of claim 1, wherein the filter media is configured to filter fuel, oil, or hydraulic.

4. The filter element of claim 1, wherein the opening is formed at the center of the top endplate.

5. The filter element of claim 1, further comprising a plurality of snap-lock tabs on the sleeve.

6. The filter element of claim 5, wherein the number of snap-lock tabs corresponds to the number of anti-rotation members, and the snap-lock tabs are formed on the anti-rotation members or the snap-lock tabs are formed on the outer surface of the sleeve in gaps between adjacent anti-rotation members.

7. A filter assembly comprising:
    a shell having a closed end, an open end and an interior space;
    a retainer secured to the open end, the retainer including a plurality of fluid flow openings extending therethrough;
    a filter element including:
        filter media suitable for filtering a fluid, the filter media is disposed in the interior space and has a first end, a second end, and defines an inner region that is surrounded by the filter media;
        a top endplate secured to the first end of the filter media, the top endplate including an opening therein that is in fluid communication with the inner region and a sleeve that is integrally formed with the top endplate so that there is no seal between the sleeve and the top endplate, the sleeve extending from the opening in a direction away from the second end to an open end thereof and defining a fluid flow passageway from the opening to the open end, the sleeve including an inner surface defining the fluid flow passageway, and at least a portion of the inner surface adjacent the open end of the sleeve is threaded;
        the top endplate further includes a flange that extends radially outward from the sleeve so as to overlap the first end of the filter media, the radially extending flange is devoid of fluid flow passageways therethrough;
        a bottom endplate secured to the second end of the filter media; and
    the retainer is separate from and secured to the top endplate, and the sleeve extends through the retainer to permit the open end to communicate with an exterior of the filter assembly.

8. The filter assembly of claim 7, wherein the filter media is generally circular, the inner region is a filtered fluid side of the filter media, and the fluid flow passageway is a fluid flow outlet for filtered fluid.

9. The filter assembly of claim 7, wherein the filter media is configured to filter fuel, oil, or hydraulic fluid.

10. The filter assembly of claim 7, wherein the opening is formed at the center of the top endplate.

11. The filter assembly of claim 7, wherein the sleeve further includes an outer surface, and comprising a plurality of anti-rotation members formed on the outer surface at spaced locations around the sleeve; and the retainer includes a plurality of anti-rotation members that are engaged with the anti-rotation members on the sleeve.

12. The filter assembly of claim 11, further comprising a plurality of snap-lock tabs on the sleeve, and the retainer includes snap-lock features that are engaged with the snap-lock tabs.

13. The filter assembly of claim 12, wherein the number of snap-lock tabs corresponds to the number of anti-rotation members on the sleeve, and the snap-lock tabs are formed on the anti-rotation members of the sleeve or the snap-lock tabs are formed on the outer surface of the sleeve in gaps between adjacent anti-rotation members.

14. The filter assembly of claim 7, wherein there is no spring within the shell that is engaged with the bottom endplate of the filter element.

15. The filter assembly of claim 7, wherein there is no seal between the top endplate and the retainer.

16. A vehicle filter assembly comprising:
   a shell having a closed end, an open end and an interior space;
   a retainer secured to the open end, the retainer including a plurality of fluid flow openings extending therethrough;
   a filter element including:
      filter media suitable for filtering a fluid, the filter media is disposed in the interior space and has a first end, a second end, and defines an inner region that is surrounded by the filter media;
      a top endplate secured to the first end of the filter media, the top endplate including an opening therein that is in fluid communication with the inner region and a sleeve that is integrally formed with the top endplate so that there is no seal between the sleeve and the top endplate, the sleeve extending from the opening in a direction away from the second end to an open end thereof and defining a fluid flow passageway from the opening to the open end thereof, the sleeve including structure suitable for securing the sleeve directly to a spud of a vehicle fluid system wherein the spud is separate from the vehicle filter assembly;
      the top endplate further includes a flange that extends radially outward from the sleeve so as to overlap the first end of the filter media, the radially extending flange is devoid of fluid flow passageways therethrough; and
      a bottom endplate secured to the second end of the filter media; and
   the retainer is separate from and secured to the top endplate, and the sleeve extends through the retainer to permit the open end of the sleeve to communicate with an exterior of the filter assembly.

17. The vehicle filter assembly of claim 16, wherein the structure comprises threads.

18. The vehicle filter assembly of claim 16, further comprising structure engaged between the top endplate and the retainer that prevents relative rotation therebetween.

19. The vehicle filter assembly of claim 16, further comprising a snap-lock connection between the top endplate and the retainer.

20. The filter element of claim 1, further comprising a plurality of axial securement members on the sleeve.

21. The filter assembly of claim 7, further comprising anti-rotation members and axial securement members on the sleeve that are engageable with the retainer to prevent relative rotation between the sleeve and the retainer and to prevent relative axial movement between the sleeve and the retainer.

22. The vehicle filter assembly of claim 16, further comprising anti-rotation members and axial securement members on the sleeve that are engageable with the retainer to prevent relative rotation between the sleeve and the retainer and to prevent relative axial movement between the sleeve and the retainer.

* * * * *